United States Patent [19]

Gallucci et al.

[11] Patent Number: 4,659,763

[45] Date of Patent: Apr. 21, 1987

[54] MODIFIED POLYPHENYLENE ETHER-POLYAMIDE COMPOSITIONS

[75] Inventors: Robert R. Gallucci, Pittsfield, Mass.; Roger W. Avakian, Brasschaat, Belgium

[73] Assignee: General Electric Company, Pittsfield, Mass.

[21] Appl. No.: 816,468

[22] Filed: Jan. 6, 1986

[51] Int. Cl.$^4$ ............................ C08K 5/07; C08K 5/08
[52] U.S. Cl. .................................. 524/358; 524/359; 525/68; 525/397; 525/905
[58] Field of Search .................. 525/397, 905, 68; 524/358, 359

[56] References Cited

U.S. PATENT DOCUMENTS

| | | | |
|---|---|---|---|
| 3,379,792 | 4/1968 | Finholt | 525/905 |
| 3,875,236 | 4/1975 | Little et al. | 524/236 |
| 4,127,558 | 11/1978 | Cooper et al. | 525/905 |
| 4,315,086 | 2/1982 | Ueno et al. | 25/391 |
| 4,338,421 | 7/1982 | Maruyama et al. | 525/397 |
| 4,373,064 | 2/1983 | Bennett, Jr. et al. | 525/68 |

Primary Examiner—Jacob Ziegler
Attorney, Agent, or Firm—Edward K. Welch, II; William F. Mufatti; Richard J. Traverso

[57] ABSTRACT

There are provided novel modified polyphenylene ether-polyamide compositions comprising polyphenylene ether, polyamide and a quinone compound for improved strength.

20 Claims, No Drawings

MODIFIED POLYPHENYLENE ETHER-POLYAMIDE COMPOSITIONS

The present invention relates to modified polyphenylene ether-polyamide compositions having improved chemical resistance, processability, elongation properties and/or impact strength as compared to unmodified compositions. More specifically, it relates to a resin composition which comprises a combination and/or the reaction product of (a) one or more polyphenylene ether resins, (b) one or more polyamide resins and (c) at least one quinone compound.

The polyphenylene ether resins are characterized by a unique combination of chemical, physical and electrical properties over a temperature range of more than 600° F., extending from a brittle point of about −275° F. to a heat distortion temperature of about 375° F. This combination of properties renders the polyphenylene ethers suitable for a broad range of applications. However, in spite of the aforementioned beneficial properties, the usefulness of the polyphenylene ether resins is limited as a consequence of their poor processability, impact resistance and chemical resistance.

Finholt (U.S. Pat. No. 3,379,792) discloses polymer blends wherein the processability of polyphenylene ether resins may be improved by blending therewith from 0.1 to 25% by weight of a polyamide. However, the advantages of the Finholt invention are limited by the fact that when the concentration of the polyamide exceeds 20% by weight, appreciable losses in other physical properties result. Specifically, there is no, or at best poor, compatibility between the polyphenylene ether and the polyamide such that phase separation of the resins occurs on molding or the molded article is inferior in mechanical properties.

Ueno et al (U.S. Pat. No. 4,315,086) discloses polyphenylene ether blends having improved chemical resistance without a loss of other mechanical properties by blending therewith a polyamide and a specific compound selected from the group consisting essentially of (A) liquid diene polymers, (B) epoxy compounds and (C) compounds having in the molecule both of (i) a carboncarbon double bond or carbon-carbon triple bond and (ii) a carboxylic acid, acid anhydride, acid amide, imide, carboxylic acid ester, amino or hydroxyl group.

Finally, Kasahara et al (EP No. 46040) discloses the use of a copolymer comprising units of a vinyl aromatic compound and either an alpha, beta-unsaturated dicarboxylic acid anhydride or an imide compound thereof as a modifier to an impact resistant polyphenylene ether-polyamide blend for improved heat resistance and oil resistance.

Applicants have now discovered novel polyphenylene ether polyamide blends having improved impact strength, elongation, chemical resistance, processability and/or heat resistance as compared to unmodified polyphenylene ether-polyamide compositions as well as reduced water absorption as compared to polyamide alone. Specifically, applicants have discovered novel resin compositions having the aforementioned properties comprising a combination of and/or the reaction product of a polyphenylene ether, a polyamide and a property improving amount of a quinone compuond. Further, these compositions may contain stabilizing and/or property improving amounts of primary or secondary amines.

Optionally, the compositions of the present invention may further comprise fillers as well as other property enhancing additives such as polymeric impact modifiers and/or inorganic reinforcing additives and/or other polymers including alkenyl aromatic polymers such as the styrenic polymers.

Although the exact physical configuration of the compositions of the present invention is not known, it is generally believed that the compositions comprise a dispersion of one polymer in the other. Applicants believe the likely configuration is wherein the polyphenylene ether is dispersed in a polyamide matrix, however, the inverse may also be possible particularly where the polyamide is present in only a minor amount. Applicants also contemplate that there may be present in the products produced hereby some graft polyphenylene ether-polyamide products. Furthermore, applicants contemplate that grafting, if present, may be such that the quinone compound may, at least in part, promote grafting and/or act as a graft-linking agent itself. Thus, all such dispersions as well as graft, partially grafted and non-grafted products are within the full intended scope of the invention.

The polyphenylene ethers suitable for use in the practice of the present invention are well known in the art and may be prepared by any of a number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference. For brevity, the term "polyphenylene ether" as used throughout this specification and the appended claims will include not only unsubstituted polyphenylene ether (made from phenol) but also polyphenylene ethers substituted with various substituents. The term also includes polyphenylene ether copolymers, graft copolymers and block copolymers of alkenyl aromatic compounds, especially vinyl aromatic compounds, as disclosed below, and a polyphenylene ether.

Suitable phenol compounds for the preparation of the polyphenylene ethers may be represented by the general formula:

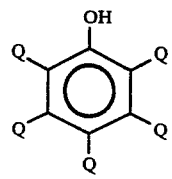

wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6, 2,5, 2,4 and 3,5 dimethylphenols; 2-methyl-6-phenyl-phenol; 2,6-diphenylphenol; 2,6-diethylphenol; 2-methyl-6-ethylphenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinione.

Illustrative of suitable polyphenylene ethers there may be given, for example, poly(2,6-dimethyl-1,4-phenylene)ether; poly(2-methyl-1,4-phenylene) ether, poly(3-methyl-1,4-phenylene)ether; poly(2,6-diethyl-1,4-phenylene)ether; poly(2-methyl-6-allyl-1,4-phenylene)ether; poly(2,6-dichloromethyl-1,4-phenylene)ether; poly(2,3,6-trimethyl-1,4-phenylene) ether; poly(2,3,5,6-tetramethyl-1,4-phenylene)ether; poly(2,6-dichloro-1,4-phenylene)ether; poly(2,6-diphenyl-1,4-phenylene)ether; poly(2,5-dimethyl-1,4-phenylene)ether and the like. Further, as mentioned above, copolymers of the phenol compounds may also be used.

Preferred polyphenylene ethers will have the formula:

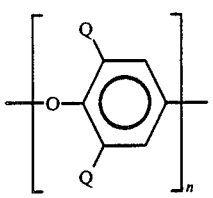

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene)ether; poly(2,6-diphenyl-1,4-phenylene)ether; poly(2,6-dimethyoxy-1,4-phenylene)ether; poly(2,6-diethoxy-1,4-phenylene)ether; poly(2-methoxy-6-ethyoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly(2,6-dimethyl-1,4-phenylene)ether; poly(2,6-diethyl-1,4phenylene)ether; poly(2-methyl-6-ethyl-1,4-phenylene)ether; poly(2,6-dipropyl-1,4-phenylene)ether; poly(2-ethyl-6-propyl-1,4-phenylene)ether; and the like; most preferably poly(2,6-dimethyl-1,4-phenylene)ether.

One method for the production of the above polyphenylene ethers is by the oxidation of a phenol compound by oxygen or an oxygen-containing gas in the presence of a catalyst for oxidative coupling. There is no particular limitation as to the choice of catalysts and any catalysts for oxidation polymerization can be employed. As typical examples of the catalyst, there may be given a catalyst comprising a cuprous salt and a tertiary amine and/or secondary amine, such as cuprous chloride-trimethylamine and dibutylamine, cuprous acetate-triethylamine or cuprous chloride-pyridine; a catalyst comprising a curpic salt, a tertiary amine, and an alkali metal hydroxide, such as cupric chloride-pyridine-potassium hydroxide; a catalyst comprising a manganese salt and a primary amine, such as manganese chloride-ethanolamine or manganese acetate-ethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

Polyamides suitable for the preparation of the compositions of the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, caprolactam, capryl-lactam, enantholactam, undecanolactam, dodecanolactam and 3- and 4- aminobenzoic acids.

Diamines suitable for use in the preparation of the polyamides include alkyl, aryl and alkyl-aryl diamines. Such diamines include, for example, those represented by the general formula:

$$H_2N(CH_2)_nNH_2$$

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylylene diamine and the like.

The dicarboxylic acids may be aromatic, for example isophthalic and terephthalic acids or aliphatic, wherein the aliphatic dicarboxylic acids are of the formula:

$$HOOC—Y—COOH$$

wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example

| | |
|---|---|
| polypyrrolidone | (nylon 4) |
| polycaprolactam | (nylon 6) |
| polycapryllactam | (nylon 8) |

| | |
|---|---|
| polyhexamethylene adipamide | (nylon 6,6) |
| polyundecanolactam | (nylon 11) |
| polydodecanolactam | (nylon 12) |
| polyhexamethylene azelaiamide | (nylon 6,9) |
| polyhexamethylene sebacamide | (nylon 6,10) |
| polyhexamethylene isophthalimide | (nylon 6,I) |
| polyhexamethylene terephthalamide | (nylon 6,T) |
| polyamide of hexamethylene diamine and n-dodeinedinic acid | (nylon 6,12) | as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane.

Copolymers of the foregoing polyamides or prepolymers thereof are also suitable for use in the practice of the present invention. Such copolyamides include copolymers of the following:

| | |
|---|---|
| hexamethylene adipamide/caprolactam | (nylon 6,6/6) |
| hexamethylene adipamide/hexamethylene-isophthalamide | (nylon 6,6/6I) |
| hexamethylene adipamide/hexamethylene-terephthalamide | (nylon 6,6/6T) |
| hexamethylene adipamide/hexamethylene-azelaiamide | (nylon 6,6/6,9) |
| hexamethylene adipamide/hexamethylene-azelaiamide/caprolactam | (nylon 6,6/6,9/6) |

Mixtures and/or copolymers of two or more of the foregoing polyamides or prepolymers thereof, respectively, are also within the scope of the present invention. Preferred polyamides are the Nylons 6; 6,6; 11 and 12, most preferably Nylon 6,6.

It is also to be understood that the use of the term "polyamides" herein and in the appended claims is intended to include the toughened or super tough polyamides. Super tough polyamides, or super tough nylons, as they are more commonly known, are available commercially, e.g. from E. I. duPont (Zytel ® ST resins), Wilson Fiberfill (NY resins), Badische (ULTRAMID ® resins), Allied (CARPION ® resins) and Celanese (7000 series resins), among others, or may be prepared in accordance with a number of U.S. patents including, among others, Epstein—U.S. Pat. No. 4,174,358; Novak—U.S. Pat. No. 4,474,927; Roura—U.S. Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. patents as well as in Caywood, Jr.—U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425-437 (1982) herein incorporated by reference and are described more fully below. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The blending ratio of polyphenylene ether to polyamide is 5 to 95% by wt. preferably 30 to 70% by wt. of the former to 95 to 5% by wt., preferably 70 to 30% by wt. of the latter. When the polyamide is less than 5 wt. percent, its effect to improve solvent resistance is small, while when it exceeds 95 wt. percent, thermal properties such as heat distortion temperature and dimensional stability tend to become poor.

As mentioned above, such polyphenylene ether-polyamide blends suffer from poor compatibility, particularly as evidenced by poor impact strength. However, surprisingly it has now been found that the highly conjugated cyclic diketones, more commonly known as quinones, are capable of enhancing the compatibility and other physical characteristics of these blends. Most any quinone is believed to provide this manifestation of improved properties.

Generally, the quinones suitable for use herein are characterized as having in the molecule at least one 6 membered carbon ring, at least two carbonyl groups (>C=O) in the ring structure, each of which may be in the same or a different ring, e.g.

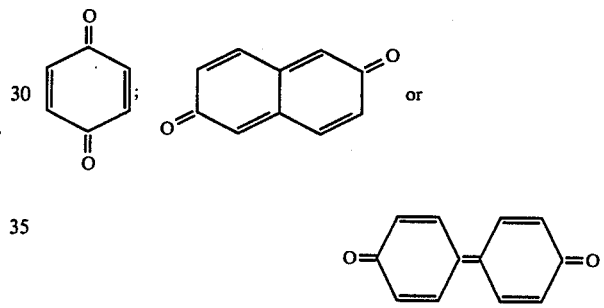

and at least two carbon-carbon double bonds in the ring structure each of which may be in the same or different ring. Where two or more rings are present in the quinone structure of the molecule, they may be either in a fused or non-fused configuration or the compound may have both fused and non-fused rings. Non-fused rings may be attached through a direct bond, particularly a carbon-carbon double bond or through a hydrocarbon radical having conjugated unsaturation, e.g. =CH-CH=.

Additionally, the quinones employable in the practice of the present invention may be substituted or non-substituted. The degree of substitution on the basic quinone structure is dependent upon the number of available sites, i.e. replaceable hydrogen atoms. Exemplary of the various substituents that may be present on the basic unsubstituted quinone structure include halogen, e.g. chlorine, bromine, fluorine, etc.; hydrocarbon substituents including saturated and unsaturated, branched and unbranched radicals of 1 to 40, preferably 1 to 8 carbon atoms selected from alkyl, aryl, arylalkyl, cycloalkyl, and the like, including halogenated derivatives thereof, and similar hydrocarbon radicals connected to the basic unsubstituted quinone structure through an oxygen, sulfur, phosphorus, or other hetero atom bridge.

Suitable quinones useful in the practice of the present invention include, 1,2- and 1,4-benzoquinone; 2,6-diphenylquinone; tetramethyl diquinone; 2,2'and 4,4'-diphenoquinone; 1,2- 1,4- and 2,6-naphthoquinone;

chloranils, 2-chloro-1,4-benzoquinone; 2,3-dichloro5,6-dicyano-1,4-benzoquinone, 2,5-dimethyl benzoquinone, 2-methylbenzoquinone, and 4,4'stilbenequinone. In the practice of the present invention the quinone compatibilizer will be employed in an amount suitable to enhance compatibility of the polyphenylene ether polyamide composition, particularly as evidenced by higher impact strength, as well as improve processability and/or other stress-strength characteristics including tensile elongation. In general, the amount of quinone employed will be from about 0.05 to about 20, preferably from about 0.1 to about 4 percent by weight based on the weight of the total composition. Obviously, greater or lesser amounts may be employed; however, too high an amount may cause loss of certain properties and too small an amount may not be sufficient to produce any benefit. In general, the specific amount of quinone compatibilizer to be employed to achieve optimum results for a given composition is dependent in part on the specific quinone compatibilizer employed, the specific resinous polymers in the composition and the weight ratio thereof as well as the process conditions and sequence employed in making the final compositions.

In addition to the improved processability, impact strength and elongation, many of the compositions prepared in accordance with the present invention manifest improvements in other physical properties and characteristics including for example, reduced water absorption.

The above-mentioned property improving quinone compound may be used alone or in combination with a primary or secondary amine. The presence of the amine is found to enhance the improvement of certain physical properties, especially brightness, when used in combination with various quinone compatabilizers. Suitable amines include those primary and secondary amines having from 1 to about 20, preferably from 1 to about 10 carbon atoms. Illustrative of said suitable amines there may be given, methyl ethylamine, diethylamine, butylamine, dibutylamine, analine, n-octadecylamine and the like. The amount of the primary or secondary amine to be used is generally up to about 3% by wt., preferably from about 0.35 to about 1% by wt.

In the practice of the present invention, it may be further desirable to add an additional modifier resin or resin combination to further improve the physical properties, particularly the impact strength, and/or processability of the composition. Such modifier resins are well known in the art and are typically derived from one or more monomers selected from the group consisting of olefins, vinyl aromatic monomers, acrylic or alkyl acrylic acids and their ester derivatives as well as conjugated dienes. Especially preferred modifier resins are the rubbery high-molecular weight materials including natural and synthetic polymeric materials showing elasticity at room temperature. Suitable modifier resins include both homopolymers and copolymers, including random, block, radial block, graft and core-shell copolymers as well as combinations thereof.

Polyolefins or olefin-based copolymer employable in the practice of the present invention include, among others, low density polyethylene, high density polyethylene, linear low density polyethylene, isotactic polypropylene, poly(1-butene), poly(4-methyl-1-pentene), propylene-ethylene copolymers, and the like. Additional olefin copolymers include copolymers of one or more alpha olefins, particularly ethylene, with copolymerizeable monomers including for example vinyl acetate, acrylic acids and alkyl acrylic acids as well as the ester derivatives thereof including for example, ethylene acrylic acid, ethylacrylate, methacrylic acid, methyl methacrylate and the like. Finally, an additional class of olefin-based copolymers suitable for use herein include the ionomer resins, which may be wholly or partially neutralized with metal ions.

A second class of modifier resins employable herein are those derived from the vinyl aromatic monomers. These include, for example, modified and unmodified polystyrenes, ABS type graft copolymers; AB and ABA type block and radial block copolymers and vinyl aromatic conjugated diene core-shell graft copolymers. Modified and unmodified polystyrenes include homopolystyrenes and rubber modified polystyrenes, such as butadiene rubber modified polystyrene otherwise referred to as high impact polystyrene or HIPS. Additional useful polystyrenes include copolymers of styrene and various monomers, including for example, poly(styrene-acrylonitrile) (SAN), styrene-butadiene copolymers as well as the modified alpha and para substituted styrenes and any of the styrene resins disclosed in U.S. Pat. No. 3,383,435, herein incorporated by reference. ABS type of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenyl arene monomers and substituted derivatives thereof as well as acrylic monomers such as acrylonitriles and acrylic and alkyl acrylic acids and their esters.

An especially preferred class of vinyl aromatic monomer derived polymer resins are the block copolymers comprising monoalkenyl arene blocks and hydrogenated, partially hydrogenated and non-hydrogenated conjugated diene blocks and represented as AB and ABA block copolymers. Suitable AB type block copolymers are disclosed in for example U.S. Pat. Nos. 3,078,254; 3,402,159; 3,297,793; 3,265,765; and 3,594,452 and UK Pat. No. 1,264,741, all herein incorporated by reference. Exemplary of typical species of AB block copolymers there may be given:
polystyrene-polybutadiene (SBR)
polystyrene-polyisoprene and
poly(alpha-methylstyrene)-polybutadiene.
Such AB block copolymers are available commercially from a number of sources including Phillips under the trademark Solprene.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Exemplary of typical species of triblock copolymers there may be given:
polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methystyrene).
A particularly preferred class of such triblock copolymers are available commercially as CARIFLEX®, KRATON D® and KRATON G® from Shell.

A third class of modifier resins suitable for use in the instant invention are those derived from conjugated dienes. While many copolymers containing conjugated dienes have been discussed above, additional conjugated diene modifier resins include for example homopolymers and copolymers of one or more conjugated dienes including for example polybutadiene, butadienestyrene copolymers, isoprene-isobutylene copolymers, chlorobutadiene polymers, butadiene-acrylonitrile copolymers, polyisoprene, and the like. Finally, ethylene-propylene-diene monomer rubbers are also intended to be within the full scope of the present invention. These EPDMs are typified as comprising prodominately ethylene units, a moderate amount of propylene units and only a minor amount, up to about 20 mole % of diene monomer units. Many such EPDM's and processes for the production thereof are disclosed in U.S. Pat. Nos. 2,933,480; 3,000,866; 3,407,158; 3,093,621 and 3,379,701, herein incorporated by reference.

An additional group of modifier resins employable in the instant invention are the core-shell type graft copolymers. In general, these are characterized as having a predominately conjugated diene rubbery core or a predominately cross-linked acrylate rubbery core and one or more shells polymerized thereon and derived from monoalkenyl arene and/or acrylic monomers alone or, preferably, in combination with other vinyl monomers. Such core-shell copolymers are widely available commercially, for example, from Rohm and Haas Company under the tradenames KM-611, KM-653 and KM-330, and are described in U.S. Pat. Nos. 3,808,180; 4,034,013; 4,096,202; 4,180,494 and 4,292,233.

Also within the scope of the present invention are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

It is also to be understood that in addition to the straight polymers and copolymers described above, there may be employed such polymers and copolymers having copolymerized therewith or grafted thereon monomers having functional groups and/or polar or active groups. Such functional groups include epoxy, amine, amide, thio, ether, ester, carboxy, anhydride, carbonyl, carboxylic acid anhydride and other like highly polar groups. Such functionalized or activated polymers and copolymers are described in the above-mentioned Epstein, Novak, Roura, Joffrion, Caywood, Swiger and Gallucci references cited above with respect to the discussion on toughened polyamides. All of such functionalized or activated polymers and copolymers may be directly blended with the ingredients to the present composiions or, as described above, may be precompound with a polyamide or polyphenylene ether. It is especially preferred to precompounded the functionalized or activated rubbery polymer or copolymer with the polyamide to prepare a toughened or super tough polyamide which is then employed in preparing the polyphenylene ether-polyamide composition of the present invention.

Finally, other suitable modifier resins and high molecular weight rubbery materials which may be employed in the practice of the present invention include for example thiokol rubber, polysulfide rubber, polyurethane rubber, polyether rubber (e.g. polypropylene oxide), epichlorhydrin rubber, ethylene propylene rubber, thermoplastic polyester elastomers, thermoplastic ether-ester elastomers and the like.

The amount of the rubbery polymer used will be up to about 100 parts by weight, preferably from about 5 to about 50 parts by weight, most preferably from about 5 to about 25 parts by weight, based on 100 parts by weight of a mixture of polyphenylene ether and polyamide. However, when the amount is less than 2 parts by weight, the effect of the rubbery polymer to improve impact resistance is poor. When the amount is more than 100 parts by weight, the impact resistance is much improved, however, some loss of other physical properties may result. Thus, in the interest of balancing impact resistance and other physical properties, it is preferred to use less than 100 parts by weight of the rubbery polymer. It is also to be understood that combinations of the above-mentioned modifier resins may be employed and are within the full intended scope of the present invention.

Finally, in addition to the foregoing, the polyphenylene ether-polyamide resin compositions of the present invention may further comprise other reinforcing additives, including glass fibers, carbon fibers, mineral fillers and the like as well as various flame retardants, colorants, stabilizers and the like known to those skilled in the art.

When employed in the practice of the present invention, reinforcing additives should be used in an amount up to no more than about 50 wt. % based on the total composition, preferably no more than about 30 wt. %. Especially preferred reinforcing additives are the filamentous and chopped glass fibers. Such glass fibers may be untreated or, preferably, treated with a silane or titanate coupling agent, and are well known in the art and widely available from a number of manufacturers.

Suitable stabilizers for use in the practice of the present invention generally include most any of the known thermal and oxidative stabilizers suitable for use with either polyamides or polyphenylene ethers. Especially preferred are those stabilizers suitable for use with polyamides. For example, liquid phosphates and hindered phenols may be employed as well as stabilizer packages encompassing combinations of hindered phenols and potassium and cuprous salts.

The method for producing the resin compositions of the present invention is not particularly limited, and the conventional methods are satisfactorily employed. Generally, however, melt blending methods are desirable. The time and temperature required for melt-blending are not particularly limited, and they can properly be determined according to the composition of the material. The temperature varies somewhat with the blending ratio of the polyphenylene ether to polyamide, but it is generally within a range of 270° to 350° C. A prolonged time and/or a high shear rate is desirable for mixing, but the deterioration of the resin composition advances. Consequently, the time needs to be determined taking into account these points.

Any of the melt-blending methods may be used, if it can handle a molten viscous mass. The method may be applied in either a batchwise form or a continuous form. Specifically, extruders, Bambury mixers, rollers, kneaders and the like may be exemplified.

The sequence of processing steps in the preparation of the present invention may also vary widely, with certain sequences, as follows, providing superior properties in the final product as compared to other sequences, for example, all ingredients may be initially and directly added to the processing system. In this process the ingredients may be premixed by dry blending and subsequently fed to the extruder or melt-blending apparatus or the ingredients individually may be added to the melt-blending apparatus.

Alternatively, it has often been found preferable to precompound any two or more of the ingredients. For example, the polyamide may be precompounded with the rubbery polymer or copolymer, particularly a functionalized rubbery polymer or copolymer, to create a toughened or supertough polyamide. Also, one can precompound the polyphenylene ether with the compatibilizer, alone or together with the rubbery polymer or copolymer. Obviously, other precompounded materials may be prepared and subsequently compounded with the remaining ingredient(s) to prepare the final composition. It is also to be noted that precompounding may be achieved in two steps whereby the precompounded material is recompounded together with the remaining ingredients or wherein an extruder having downstream feed port(s) is employed such that two or more ingredients are added at the throat of the screw and subsequently compounded and the remaining ingredients added to the melt via the downstream feed port. Finally, where an ingredient is to be precompounded, one can precompound all or only a portion of that ingredient. In essence, any sequence of precompounding may be employed in the practice of the present invention.

The following examples are presented in order that those skilled in the art may better understand how to practice the present invention. These examples are merely presented by way of illustration and are not intended to limit the invention thereto. Unless otherwise stated, all formulations are expressed in terms of parts by weight.

EXAMPLES E1-E5 AND COMPARATIVE EXAMPLES CE1-CE2

A series of polyphenylene ether-polyamide compositions within and outside of the scope of the present invention were prepared. All compositions were prepared on a single screw extruder by direct addition of ingredients and extruded at 300° C. The extrudate was pelletized and injection molded to form test parts upon which physical property testing was performed. The specific composition and the physical properties thereof are shown in Table 1.

TABLE 1

| Ingredients | CE1 | E1 | E2 | CE2 | E3 | E4 | E5 |
|---|---|---|---|---|---|---|---|
| polyphenylene ether[a] | 70 | 70 | 70 | 50 | 50 | 50 | 50 |
| polyamide 6,6[b] | 30 | 30 | 30 | 50 | 50 | 50 | 50 |
| 1,4-benzoquinone | — | 1.0 | 2.0 | — | 1.0 | — | — |
| tetramethyl diquinone | — | — | — | — | — | 1.0 | — |
| 2,6-diphenylquinone | — | — | — | — | — | — | 1.0 |
| Unnotched Izod (ft.-lbs./in.) | 2.8 | 4.1 | 10.3 | 5.7 | 20.9 | 14.9 | 28.5 |

[a]poly(2,6-dimethyl-1,4-phenylene)ether produced by General Electric Company
[b]polyamide 6,6 from E. I. duPont Obviously, from the results shown in Table 1, the use of various quinones in the preparation of the polyphenylene ether-polyamide composition provide greatly and unexpectedly enhanced impact strength. Further, from Examples E1 and E2, it appears that higher amounts of the quinone compatibilizer are preferred and provide increasing impact enhancement.

EXAMPLES E6-E8 AND COMPARATIVE EXAMPLES CE3-CE4

A second series of Examples were prepared by the same method as above; however, a rubbery copolymer was also added to the composition. The specific formulations and the physical properties thereof are shown in Table 2.

Once again, from these Examples it is clear that the use of quinones in the preparation of rubber modified polyphenylene ether-polyamide composition leads to greatly and unexpectedly enhanced impact strength as well as percent elongation in said compositions.

TABLE 2

|  | CE3 | E6 | E7 | CE4 | E8 |
|---|---|---|---|---|---|
| polyphenylene ether[a] | 49 | 49 | 49 | 49 | 49 |
| polyamide 6,6[b] | 41 | 41 | 41 | 41 | 41 |
| SEBS[c] | 10 | 10 | 10 | 10 | 10 |
| 1,4-Benzoquinone | — | 0.5 | — | — | 1.0 |
| Chloranil | — | — | 0.5 | — | — |
| Notched Izod ft.-lb./in. | — | — | — | 0.4 | 1.2 |
| Unnotched Izod ft.-lb/in. | 3.4 | 9.3 | 8.8 | — | — |
| Gardner Impact in.-lbs. | — | — | — | 10 | 70 |
| % Elongation | — | — | — | 4 | 10 |

[a]poly(2,6-dimethyl-1,4-phenylene)ether from General Electric Company
[b]polyamide 6,6 from E. I. duPont
[c]Styrene hydrogenated polybutadiene styrene triblock copolymer from Shell Obviously, other modifications and variations of the present invention are possible in light of the above teachings. It is therefore to be understood that changes may be made in the particular embodiments of the invention described which are within the full intended scope of the invention as defined by the appended claims.

We claim:

1. A novel resin composition comprising (a) one or more polyphenylene ether resins, (b) one or more polyamide resins and (c) one or more quinone compounds and the reaction products thereof, wherein the quinone compound is employed in an amount sufficient to increase the strength or elongation of the composition as compared to an unmodified polyphenylene ether-polyamide blend.

2. The composition of claim 1 wherein the quinone compound is unsubstituted and characterized as having in the molecule at least one 6 membered carbon ring; at least two carbonyl groups in the ring structure, both of which may be in the same or in different rings, provided they occupy positions corresponding to the 1,2- or 1,4- orientation of the monocyclic quinone; and at least two carbon-carbon double bonds in the ring structure, provided that the carbon-carbon double bonds and the carbon-oxygen double bond of the carbonyl groups in the unsubstituted quinone are conjugated.

3. The composition of claim 2 wherein the unsubstituted quinone is polycyclic and the rings are fused or non-fused, provided that the non-fused rings are connected by a carbon-carbon double bond or by the following radical =C—C=.

4. The composition of claim 2 wherein the quinone is substituted with one or more substituents, each independently selected from the group consisting of halogens; saturated and unsaturated, branched and unbranched hydrocarbon radicals including alkyl, aryl, alkylaryl, cycloalkyl, and halo derivatives thereof; and similar hydrocarbon radicals being connected to the unsubstituted quinone structure through an oxygen, sulfur or phosphorus atom; and the degree of substitution being from 1 to the maximum number of replaceable hydrogen atoms.

5. The composition of claim 1 wherein the quinone compound is selected from the group consisting of 1,2-and 1,4-benzoquinone; chloranil; tetramethyldiquinone and 2,6-diphenylquinone.

6. The composition of claim 1 wherein the quinone is employed in an amount from about 0.05 to about 20 percent by weight based on the weight of the total composition.

7. The composition of claim 1 wherein the quinone is employed in an amount of from about 0.1 to about 4 percent by weight based on the weight of the total composition.

8. The composition of claim 1 wherein the ratio of polyphenylene ether to polyamide is from 5 to 95% by weight of the former to 95 to 5% by weight of the latter.

9. The composition of claim 1 wherein the ratio of polyphenylene ether to polyamide is from 30 to 70% by weight of the former to 70 to 30% by weight of the latter.

10. The composition of claim 1 wherein the polyphenylene ether is a homopolymer or a copolymer having units with the repeating structural formula:

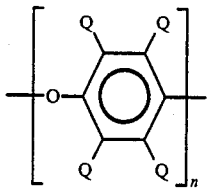

wherein the oxygen ether atom of one unit is connected to the benzene nucleus of the next adjoining unit, and n is a positive integer and is at least 50, and each Q is independently a monovalent substituent selected from a group consisting of hydrogen, halogen, hydrocarbon and hydrocarbonoxy groups free of a tertiary alpha-carbon atom and halohydrocarbon and halohydrocarbonoxy groups free of a tertiary alpha-carbon atom and having at least 2 carbon atoms between the halogen atom and the phenyl nucleus.

11. The composition of claim 1 wherein the polyphenylene ether is poly(2,6-dimethyl-1,4-phenylene)ether.

12. The composition of claim 1 wherein the polyamide is selected from the group consisting of polyamide 6; polyamide 6,6; polyamide 12 and polyamide 6/10 and such polyamide precompounded with a functionalized rubber.

13. The composition of claim 12 wherein the polyamide is polyamide 6,6.

14. The composition of claim 1 which further comprises up to about 100 parts by weight of a modifier resin based on 100 parts by weight of the combination of polyphenylene ether and polyamide.

15. The composition of claim 14 wherein the modifier resin is present in an amount of up to about 50 parts by weight based on the total composition.

16. The composition of claim 14 wherein the modifier resin is selected from the group consisting essentially of hydrogenated, partially hydrogenated or non-hydrogenated styrene-butadiene diblock or styrene-butadiene-styrene triblock copolymers; styrene homopolymers and copolymers; rubber modified polystyrene and ethylene propylene and ethylene propylene diene monomer terpolymer rubbers.

17. The composition of claim 14 wherein the modifier resin is an hydrogenated, partially hydrogenated or non-hydrogenated, styrene-butadiene diblock or styrene-butadiene-styrene triblock copolymer.

18. The composition of claim 14 wherein the modifier resin is a styrene homopolymer or copolymer.

19. The composition of claim 14 wherein the modifier resin is a rubber modified high impact polystyrene.

20. The composition of claim 14 wherein the modifier resin is a functionalized rubber polymer or copolymer and the functional group is selected from the group consisting of epoxy, amine, amide, thio, ether, ester, carboxy, anhydride, and carbonyl groups.

* * * * *